DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED APRIL 6, 1976

945 O.G. 30

T945,094

POLYAMINES AND THEIR PRODUCTION

Joseph Kestutis Valaitis, University Heights, and Harold James Harwood, Stow, Ohio, assignors to The Firestone Tire & Rubber Company, Akron, Ohio Continuation of application Ser. No. 352,845, Apr. 19, 1973. This application Dec. 16, 1974, Ser. No. 540,351

Int. Cl. C08g *73/02*

U.S. Cl. 260—2 R

1 Sheet Drawing. 6 Pages Specification

Polyamines of the formula:

$$NH_2(R—NH)_nR—NH_2$$

in which R is aliphatic or aromatic and *n* is 2 or more, are produced by heating an amine or a mixture of amines to such a high temperature that ammonia is liberated. The reaction is preferably carried out in the presence of a catalyst.

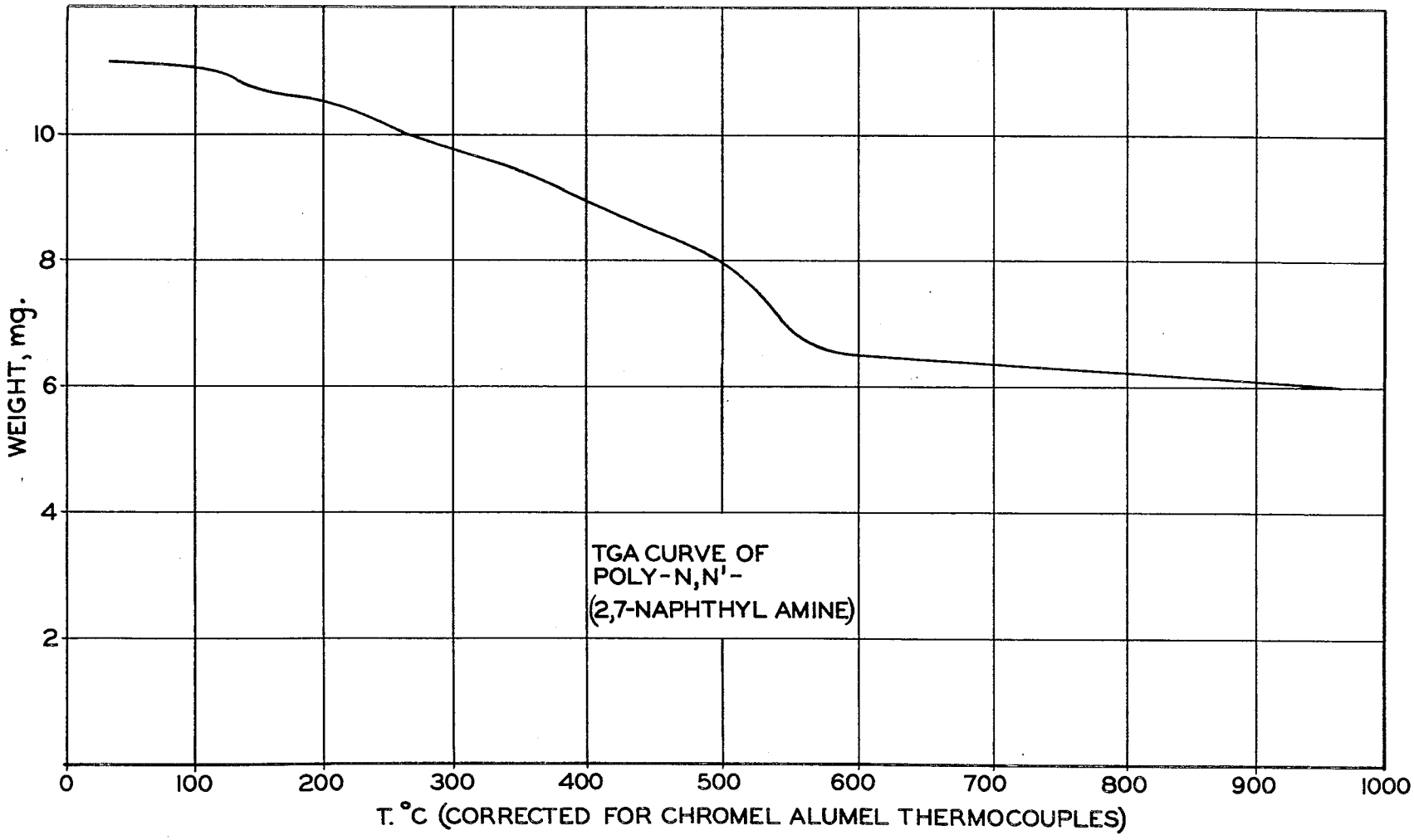
TGA CURVE OF
POLY-N,N'-
(2,7-NAPHTHYL AMINE)
WEIGHT, mg.
10
8
6
4
2
0
100
200
300
400
500
600
700
800
900
1000
T. °C (CORRECTED FOR CHROMEL ALUMEL THERMOCOUPLES)